United States Patent

[11] 3,631,269

[72] Inventor Joseph E. Monahan
Framingham, Mass.
[21] Appl. No. 787,662
[22] Filed Dec. 30, 1968
[45] Patented Dec. 28, 1971
[73] Assignee Honeywell Inc.
Minneapolis, Minn.

[54] DELAY APPARATUS
11 Claims, 9 Drawing Figs.

[52] U.S. Cl. .......... 307/293, 307/208, 307/218, 307/247, 307/291, 328/55
[51] Int. Cl. .......... H03k 17/26
[50] Field of Search .......... 307/218, 291, 293, 208, 247; 320/55, 94, 63

[56] References Cited

UNITED STATES PATENTS

| | | | |
|---|---|---|---|
| 3,327,226 | 6/1967 | Nourney | 307/218 |
| 3,339,145 | 8/1967 | MacSorley | 307/218 |
| 3,448,389 | 6/1969 | Suzuki | 307/247 |
| 3,479,603 | 11/1969 | Overstreet | 328/63 |

OTHER REFERENCES

Goodell, Journal of Computing Systems, Vol. 1, No. 2, Jan. 1953, p. 97.

Lode, Journal of Computing Systems, Vol. 1, No. 1, June, 1952, p. 21.

*Primary Examiner*—Donald D. Forrer
*Assistant Examiner*—David M. Carter
*Attorneys*—Fred Jacob and Ronald T. Reiling

ABSTRACT: Apparatus is disclosed in an integrated circuit for generating a pulse, adaptable for triggering a complementing bistable circuit, using inverter delay means without capacitive or inductive elements including at least one logic inverter circuit to provide the necessary delay.

JOSEPH E. MONAHAN
INVENTOR.

BY W. Hugo Liepmann
ATTORNEY.

JOSEPH E. MONAHAN
INVENTOR.
BY W. Hugo Liepmann
ATTORNEY.

JOSEPH E. MONAHAN
INVENTOR.

BY W. Hugo Liepmann

ATTORNEY.

DELAY APPARATUS

BACKGROUND OF THE INVENTION

This invention relates to delay circuits devoid of capacitive and inductive elements used as energy storage devices. More particularly, it relates to pulse generator systems employing such circuits, especially in integrated circuit form.

The basic Eccles-Jordan multivibrator circuit, often referred to as a flip-flop, requires two separate inputs to provide complete switching action: when the flip-flop is in the first state, a signal on the first input is required to switch it to the second state and when in the second state, a signal on the second input is required to switch it to the first state. This type of flip-flop cannot count a succession of pulses unless they are alternately provided to the two inputs.

In order to convert that type of flip-flop to a counting or complementing flip-flop, so named because every input pulse causes both outputs to change to their logic complements, and which can directly count a succession of pulses, an AND circuit is provided at each input. The first AND circuit, having an output connected to the first input of the flip-flop, has one input connected to the input terminal that receives the succession of pulses and the other input connected to the second output of the flip-flop. The second AND circuit, having an output connected to the second input of the flip-flop, has one input connected to the flip-flop input terminal and the other input connected to the first output of the flip-flop. Since the inputs are cross-coupled with the outputs in this manner, when the input pulse at binary one is supplied to both AND circuits, only the AND circuit whose corresponding flip-flop output is at binary zero develops a signal at its output. For example, if the first flop output is at one and the second is at zero, the one at the first output is fed back to the input of the second AND circuit and causes the next pulse to be steered through the second AND circuit to the second input.

With such an arrangement, an incoming pulse has to be long enough to trigger the flip-flop, but not so long that it would still be present after the circuit flipped, for then the circuit switches again on the same pulse. In large electronic systems precision central pulse generators are used to provide the proper pulses to all flip-flops no matter how remote. Complex and expensive pulse-generating and - shaping circuits are necessary in such systems to ensure that after traveling long distances and being subjected to distorting influences, the pulses are of the proper length and shape to operate the flip-flops.

In order to eliminate the complex, centralized pulse generating and-shaping circuits, yet maintain the necessary pulse timing, local pulse generators were conceived. Such local pulse generator is associated with each flip-flop so that no matter how unrefined or distorted an incoming pulse may be, the pulse produced in response to it by the local pulse generator is of the proper shape and duration. Such pulse generators generally include a passive, energy-storing, delay element: A capacitive or inductive element of some sort, e.g. an induction coil, a capacitor, a pulse transformer, or a coaxial cable. Such a delay element was considered necessary for timing the desired output pulse produced in response to the incoming pulse.

With development of the integrated circuit, in which a number of active and passive circuit elements are inseparably associated on or within a continuous body to perform the function of a circuit, it became desirable to eliminate or minimize the use of capacitive and inductive elements as energy storage devices to produce delay, for one such element costs as much to fabricate in integrated circuit technology as 30 or 40 transistors.

As a result, local pulse generators were supplanted by a "-double rank" flip-flop circuit which uses a master flip-flop settable by a pulse leading edge, and inhibited from change by the pulse lagging edge. The master flip-flop output is passed to the second or slave flip-flop upon the arrival of the pulse lagging edge, and is inhibited from change by the pulse leading edge. Although this type of flip-flop arrangement obviates the need for capacitive or inductive elements to generate a pulse, it requires two flip-flops, and hence twice the flip-flop operational time, generally 40 nanoseconds, to provide the proper output of the slave flip-flop. Further, a complete switching operation requires a full pulse to provide both lagging and leading edges.

SUMMARY OF INVENTION

It is therefore an object of this invention to provide delay apparatus including a circuit devoid of capacitive and inductive elements used as energy storage devices to provide delay.

It is a further object of this invention to provide such a pulse generator that delays an input signal transition.

It is a further object of this invention to provide such a pulse generator which can be inexpensively fabricated as a part of an integrated circuit.

It is a further object of this invention to provide such a pulse generator having delay means consisting of only semiconductor and resistive elements to provide delay, and devoid of capacitive or inductive elements used to provide delay or output signal timing.

It is a further object of this invention to provide such a pulse generator which is combinable in an integrated circuit with a steering circuit.

It is a further object of this invention to provide such a pulse generator which provides a pulse of the proper shape and duration to switch an associated flip-flop, and uses less expensive components in an integrated circuit.

It is a further object of this invention to provide such a pulse generator in which the period of the pulse is automatically adjusted during the fabrication of the integrated circuit to the proper duration for operating its associated flip-flop. It is also an object of the invention to provide circuits having the foregoing features and which operate with high speed.

The invention may be accomplished by a pulse-generator system in an integrated circuit. The pulse generator system has input means for receiving input signals in either of first and second states, and logic circuit means having a first input and a second input and providing an output when all of its inputs are in a first state. There are means for connecting the input means to the first input of the logic circuit means and inverter delay means connecting the input means to the second input of the logic circuit means. The logic circuit means provides an output pulse beginning when the signals at each of its inputs are in the first state and ending when the inverter delay means produces an inverted delayed signal of the second state to the second input of the logic circuit means. The inverter delay means is formed of one or more logic inverter circuits devoid of capacitive and inductive elements operative in timing its output signal in response to its input signal.

DISCLOSURE OF PREFERRED EMBODIMENT

Other objects, features and advantages will occur from the following description of a preferred embodiment and the accompanying drawings, in which.

Figure 1:
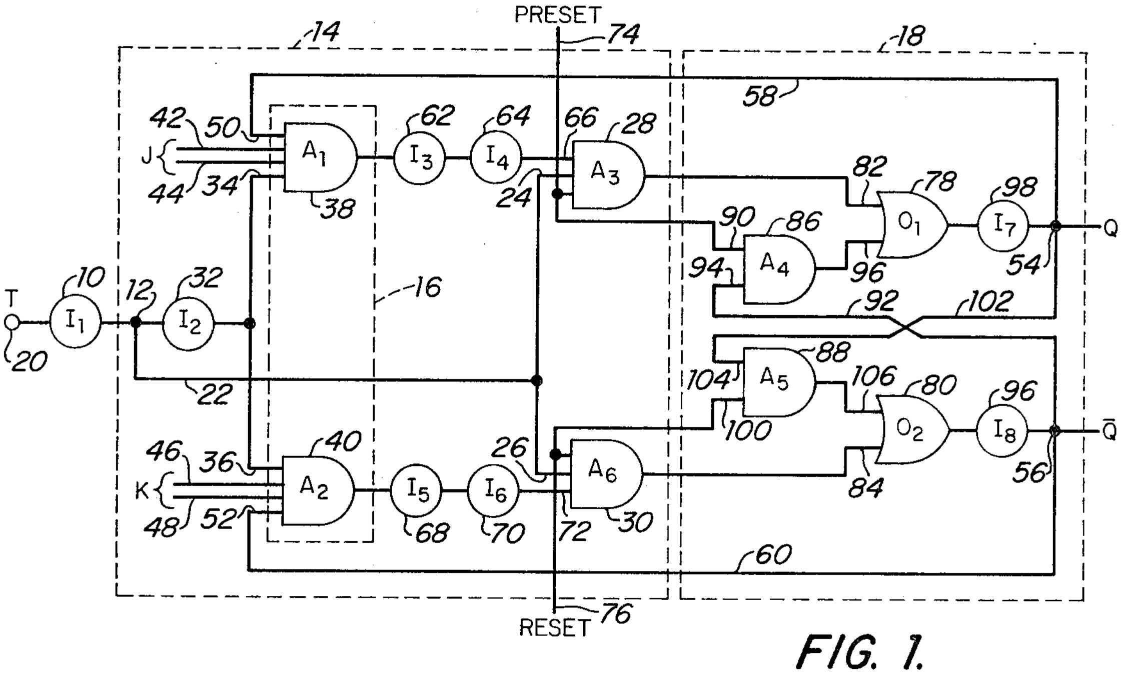
FIG. 1 is a logic block diagram of a pulse-generating system according to this invention coupled with a flip-flop circuit arrangement.

In one embodiment of the invention, an incoming signal is inverted so that the normally positive-going or "logic-one-going" leading edge is transformed to a negative-going or "logic-zero-going" leading edge similar to the lagging edge of the original incoming pulse. This inversion enables the remainder of the circuit to act on a negative transition. Negative transition operation is preferred to positive transition operation because after the negative transition there is a zero or low-level continuing condition which prohibits changes which may cause false triggerings.

This negative transition is fed to a steerable bistable circuit which has a steering circuit operating with a pulse generating circuit which, in turn, drives a flip-flop. The pulse generating circuit can include an input terminal connected directly to the first inputs of two AND circuits, the first AND circuit being connected to the first flip-flop input and the second AND circuit being connected to the second flip-flop input. In an embodiment where the flip-flop operates with a two unit delay, the input terminal is also connected to a first logic inverter common to two inverter delay means each of which includes two more inverters. The output of the first inverter delay means connects to the second input of the first AND circuit and the output of the second inverter delay means connects to the second input of the second AND circuit.

The steering circuit illustratively has a third AND circuit connecting the common inverter to the remainder of the first inverter delay means and a fourth AND circuit connecting the common inverter to the remainder of the second inverter delay means. The third AND circuit receives an input from the common inverter, and an input from the first flip-flop output, which is the output corresponding to the first flip-flop input to which the first inverter delay means is connected through the first AND circuit. The fourth AND circuit similarly receives inputs from the common inverter and from the second flip-flop output, which corresponds to the second flip-flop input to which the second inverter delay means is connected through the second AND circuit.

With this arrangement the steering circuit steers an incoming pulse to the flip-flop input whose corresponding output is in the logic one state and, when that output switches to logic zero, that logic zero is provided to the other input of the flip-flop to switch the other flip-flop output from the zero to the one state.

The pulse is generated because when a logic zero appears at the input terminal (on the pulse generation) a logic one is supplied to the third and fourth steering AND circuits. The one of those AND circuits having a logic one fed back from the flip-flop output produces a logic one at its output which is doubly inverted, (in the pulse generation delay means), resulting in a logic one at a second input of the one of the first and second AND circuits connected to the input of the flip-flop corresponding to the output of the flip-flop from which the one was fed back. When next a logic one appears at the pulse generator input terminal, that logic one is immediately steered to one input of the selected one of the first and second AND circuits in inverted form and delayed by three units of delay because the signal must pass through the common inverter and the double inverter of the particular associated inverter delay means. Therefore, the previously established logic one is present at that input of that AND circuit for three units of delay coincidentally with the instantly applied logic one. As a result, that AND circuit has an output of three unit delay duration. That three unit delay is sufficient for the flip-flop, which as noted above, illustratively has a two circuit delay, to switch states and stabilize. Thus, a pulse of three unit duration has been generated using inverter circuits wherein only elements such as transistors and resistors have been used to provide the delay: no separate capacitors or inductors are necessary, even for delay or timing purposes. And hence, having no capacitors or inductors, the circuits can be inexpensively fabricated with integrated circuit techniques.

In circuits using AND, OR, and inverter circuits or combinations thereof, the major delays take place in the inverter circuits: AND and OR gates generally produce a 1 nanosecond delay whereas inverters generally produce 12 to 15 nanosecond delay. Since semiconductors flip-flop, and especially those of integrated circuit form, use AND, OR and inverter circuits, the delays produced by flip-flops are substantially determined by the inverter circuits used in the flip-flops. Therefore, when a particular pulse generator according to this invention should operate according to the delay introduced by the inverter circuits in a flip-flop with which the pulse generator will operate, the use of like manufacture for the pulse generator and the flip-flop, and preferably integrated fabrication on a common chip, will result in characteristics of the flip-flop inverter circuits to affect the delay characteristics of the pulse generator inverter circuits similarly. Hence, an increase or decrease in the flip-flop delay will be met by a like increase or decrease in pulse duration, thus the delays of the integrated circuit pulse generator and flip-flop are automatically matched to each other during manufacture.

FIG. 1 shows such an embodiment fabricated as an integrated circuit having $I_1$ inverter 10 connected to the input terminal 12 of pulse generator 14, which includes a steering circuit 16. A flip-flop 18 is connected to the outputs of pulse generator 14.

The logic operation of the circuit of FIG. 1 may be understood by following the condition of the various AND, OR and inverter circuits when a logic one is present at toggle input T, terminal 20. When terminal 20 is in the one state: the output of $I_1$ inverter 10 at terminal 12 is in the zero state. The zero state at terminal 12 is delivered on line 22 directly to the inputs 24, 26 of $A_3$ AND circuit 28 and $A_6$ AND-circuit 30 respectively. Also when terminal 12 is at zero state, the output of $I_2$ inverter 32 is at the one state which is communicated to inputs 34, 36 of $A_1$ AND-circuit 38 and $A_2$ AND-circuit 40, respectively, which together form steering circuit 16. Inputs 42, 44 of $A_1$ AND-circuit 38 and inputs 46, 48 of $A_2$ and-circuit 40 can be used as conventional "J,K" inputs and are assumed to be in the same state. The other input 50 of $A_1$ AND circuit 38 and the other input 52 of $A_2$ AND-circuit 40 are connected to the Q, Q output terminals 54, 56 of flip-flop 18, by lines 58, 60, respectively, which cross couple flip-flop inputs and outputs so as to prevent ambiguity of flip-flop response to an incoming pulse. With output terminal 54 at the zero state and output terminal 56 at the one state, $A_1$ AND circuit 38 is disabled and its output is at zero state, but $A_2$ AND circuit 40 has all its inputs present in the one state and provides an output at the one state. In this manner an incoming pulse is steered away from the flip-flop input whose corresponding output is at the zero state and towards the input whose corresponding output is at the one state.

The zero state output of $A_1$ AND-circuit 38 is inverted by $I_3$ inverter 62, and again by $I_4$ inverter 64, so that a zero state is applied to input 66 of $A_3$ AND-circuit 28. Similarly, the one state output of $A_2$ AND-circuit 40 is inverted by $I_5$ inverter 68, and again by $I_6$ inverter 70 so that a one state is applied to input 72 of $A_6$ AND-circuit 30. The preset 74 and reset 76 lines provide conventional external signal levels considered as constantly in the one state for purposes of this explanation. In this manner, the output of an inverting delay device including inverters 32, 62, and 64 is provided to input 66 of $A_3$ AND-circuit 28, and the output of an inverting delay device including inverters 32, 68, and 70 is provided to input 72 of $A_6$ AND-circuit 30. Note that each such inverting delay device has an odd number, three in the illustrated embodiment, of series-connected inverters.

Since all AND circuits used in this invention are logic combining means of the type in which all inputs must simultaneously be in the one state for there to be an output at the one state, both the $A_3$ AND-circuit 28 and the $A_6$ AND-circuit 30 have outputs in the zero state, which zero states are communicated to input 82 of $O_1$ OR circuit 78 and to input 84 of $O_2$ OR circuit 80.

An $A_4$ AND-circuit 86 and an $A_5$ AND-circuit 88 perform a latching function for flip-flop 18. $A_4$ AND-circuit 86 receives the preset one state in input 90 and receives the one state present on output terminal 56 of flip-flop 18 via line 92 on input 94. Thus the output of $A_4$ AND-circuit 86 is in the one state which is presented at input 96 of $O_1$ OR circuit 78 causing its output to be in the one state. The output of $I_7$ inverter 98 at output terminal 54 is thus at the zero state.

Similarly, the $A_5$ AND-circuit 88 receives the reset one state on input 100; and receives the zero state present on output terminal 54 of flip-flop 18 via line 102 at input 104. Thus the output of $A_5$ AND-circuit 88 is in the zero state, which is presented at the input 106 of $O_2$ OR circuit 80 causing its output to be in the zero state. The output of $I_8$ inverter 96 at output terminal 56 is therefore at the one state.

Figure 2:
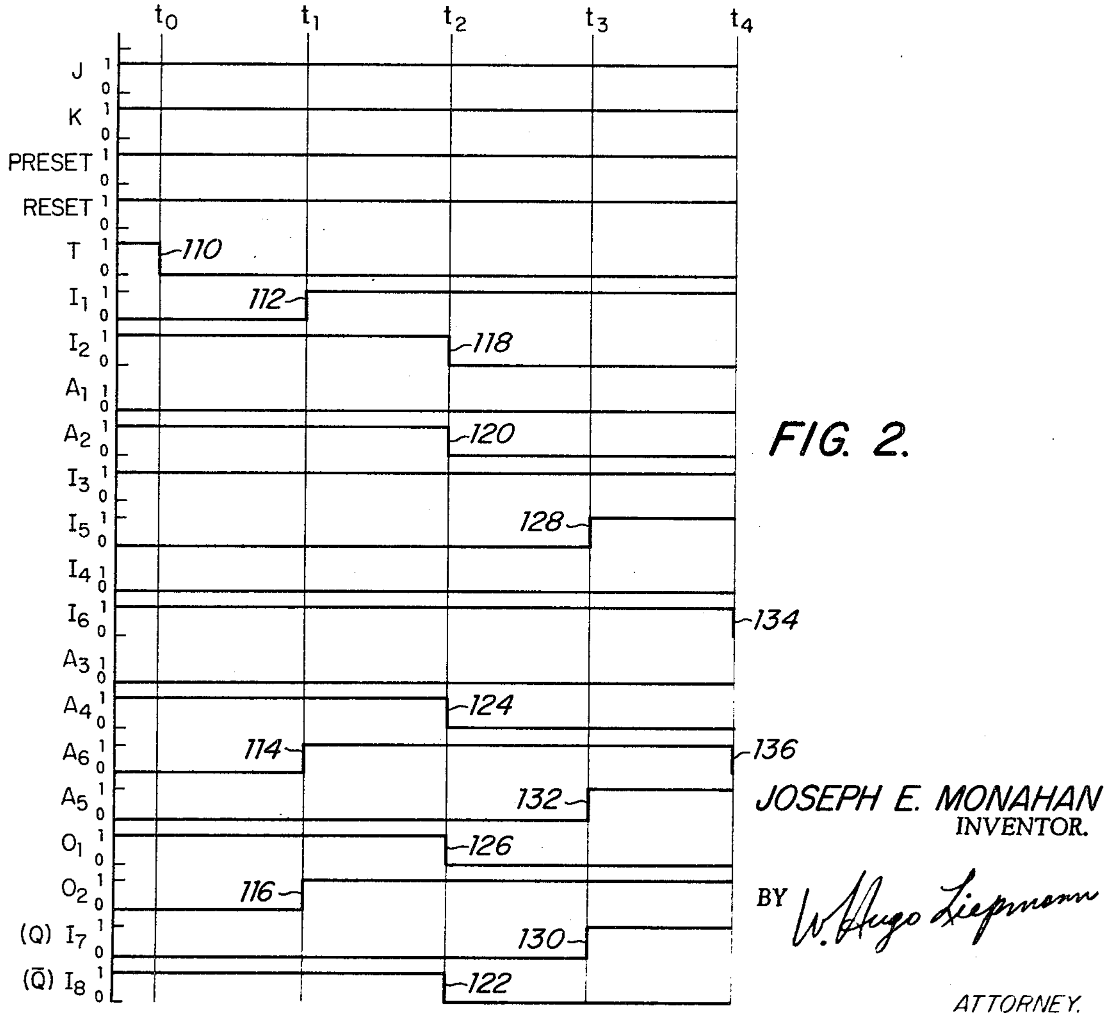
FIG. 2 is a timing diagram showing the sequence of operation for the circuit of FIG. 1.

The timing of the circuit of FIG. 1 which results in the generation of a pulse to operate the flip-flop may be better understood with reference to the timing chart of FIG. 2. In FIG. 2, the time prior to $t_0$ represents the condition of each of the components of the circuit of FIG. 1 with a one state signal on the T input, as just described in connection with FIG. 1. The J, K preset and reset signals are assumed to remain at the one state throughout the operation, FIG. 2.

At time $t_0$ the toggle T input changes from the one to the zero state, FIG. 2 transition 110. The delay produced by the AND and OR circuits is considered negligible and the delays produced by each inverter is considered as one unit of delay. Thus one unit of delay after $t_0$, at time $t_1$, the output of $I_1$ inverter 10, input terminal 12, changes from the zero state to the one state, transition 112. That transition 112 is immediately presented on line 22 to input 26 of $A_6$ AND-circuit 30. Since all inputs 26, 72, 76, to $A_6$ AND-circuit 30 are now in the one state, the output of $A_6$ AND-circuit 30, thus also the output of $O_2$ OR-circuit 80, immediately switches to the one state, transitions 114, 116, respectively.

One unit delay later, at time $t_2$, the output of $I_2$ inverter 32 switches from the one to the zero state, transition 118, and that zero state is communicated to inputs 34 and 36 of $A_1$ AND-circuit 38, and $A_2$ AND-circuit 40 respectively. $A_1$ AND-circuit 38 presently receives a zero state on input 50 and so its output remains at zero. But $A_2$ AND-circuit 40 which previously had all ones at its input now has its output switched from one to zero, transition 120.

Simultaneously, at time $t_2$, the output of $I_8$ inverter 96 switches from one to zero, transition 122, and the resultant new zero state appearing at terminal 56 is immediately provided to input 94 of $A_4$ AND-circuit 86 changing its output from one to zero transition 124, which then drives the output of $O_1$ OR-circuit 78 from one to zero, transition 126. The output of $I_8$ inverter 96 at terminal 56 is delivered to input 52 of $A_2$ AND-circuit 40 on line 60 and further insures that the output of $A_2$ AND-circuit 40 stays at zero regardless of any inadvertent change on the input 36.

At time $t_3$, $I_5$ inverter 68 output switches from zero to one, transition 128, and $I_7$ inverter 98 switches from zero to one, transition 130. This one state is immediately reflected at terminal 54, input 50 of $A_1$ AND-circuit 38, and input 104 of $A_5$ AND-circuit 88. The one state on input 50 determines that the next incoming pulse will be steered through $A_1$ AND-circuit 38. Input 34 still at zero prevents $A_1$ AND-circuit 38 from switching to the one state until the next time the T input switches to the one state, thereby preventing regenerative feedback triggering. At any time hereafter the T input may change, allowing the next pulse to start. The one state on input 104 of $A_5$ AND-circuit 88 enables that circuit to provide a one output, transition 132, to $O_2$ OR-circuit 80 which already has a one at its output, supplied to $I_8$ inverter 96. Now both $A_5$ AND-circuit 88 and $A_6$ AND-circuit 30 are providing one inputs to $O_2$ OR-circuit 80 to maintain terminal 56 at zero.

AFter a unit delay, at time $t_4$, $I_6$ inverter 70 switches from the one to the zero state, transition 134, which zero state appears at input 72 and switches, transition 136, $A_6$ AND-circuit 30, so that a zero state appears at input 84 of $O_2$ OR-circuit 80. However, that OR-circuit maintains its one state output, thus the zero state on terminal 56, by means of $A_5$ AND-circuit 88 latched by the one state on line 102.

Thus, a pulse of three unit delay duration has been generated at the output of $A_6$ AND-circuit 30 between the transitions 114 and 136. That three-unit pulse is sufficient to switch the state of flip-flop 18 and yet be gone by the time another incoming signal arrives. Further, that pulse began when the signal from $I_1$ inverter 10 appeared at the input terminal 12 and simultaneously appeared at the delay circuit output, i.e. the input 26 of $A_6$ AND-circuit 30, and ended three units of delay later when the signal from $I_1$ inverter 10 arrived at the other delay circuit output, i.e. the input 72 of $A_6$ AND-circuit 30.

The next pulse received at T input 20 is steered through $A_1$ AND-circuit 38 and the switching of the circuit continues in the same manner as set forth, supra, with the exception that the pulse is now generated using $I_3$ inverter 62, $I_4$ inverter 64 and $A_3$ AND-circuit 28. Operation continues in this manner as the incoming pulses are alternately steered through $A_1$ AND-circuit 38 and $A_2$ AND-circuit 40.

It should be noted that the FIG. 1 pulse generator 14 provides reliable operation with an input signal, at terminal 12, meeting only minimal time requirements. In particular, for producing the three unit pulse as described above, the terminal 12 input signal should remain in either state for a minimum of two delay units, and each switching cycle of the signal, i.e. a succession of a single-zero state and a single-one state, should have a total minimum duration of six delay units. Also, the pulse generator 14 operates in accordance with external control signals, applied to whatever J–K terminals 42, 44, 46, 48 are provided on the steering AND-circuits 38 and 40 even when these signals are present only during the initial input signal transition in each operating cycle, e.g., during the FIG. 2 transition 110 at time $t_0$.

It should also be noted that the inverting delay devices in the FIG. 1 pulse generator 14 (i.e. the series arrangement of inverters 32, 62 and 64 and the like arrangement of inverters 32, 68 and 70) can have other than three inverters as illustrated; however, each should have an odd number of inverters to disable the associated AND-circuit 28 or 30 after the desired delay interval with a signal state opposite to the state the AND-circuit receives via line 22.

The delay circuits of this invention may be used in other than pulse generating systems. Pulse generating systems using those delay circuits need not be constructed as pulse generator 14, FIG. 1, but rather may take any configuration necessary to accomplish the delay required and logic desired. Various other flip-flop and other control circuits may be served by pulse-generating circuits in accordance with this invention. If automatic matching of flip-flop delay to pulse duration is desired, the inverters in the flip-flop circuit should have characteristics similar to those of the inverters of the pulse generator 14.

Figures 3, 4, 5, 6, 7, 8:
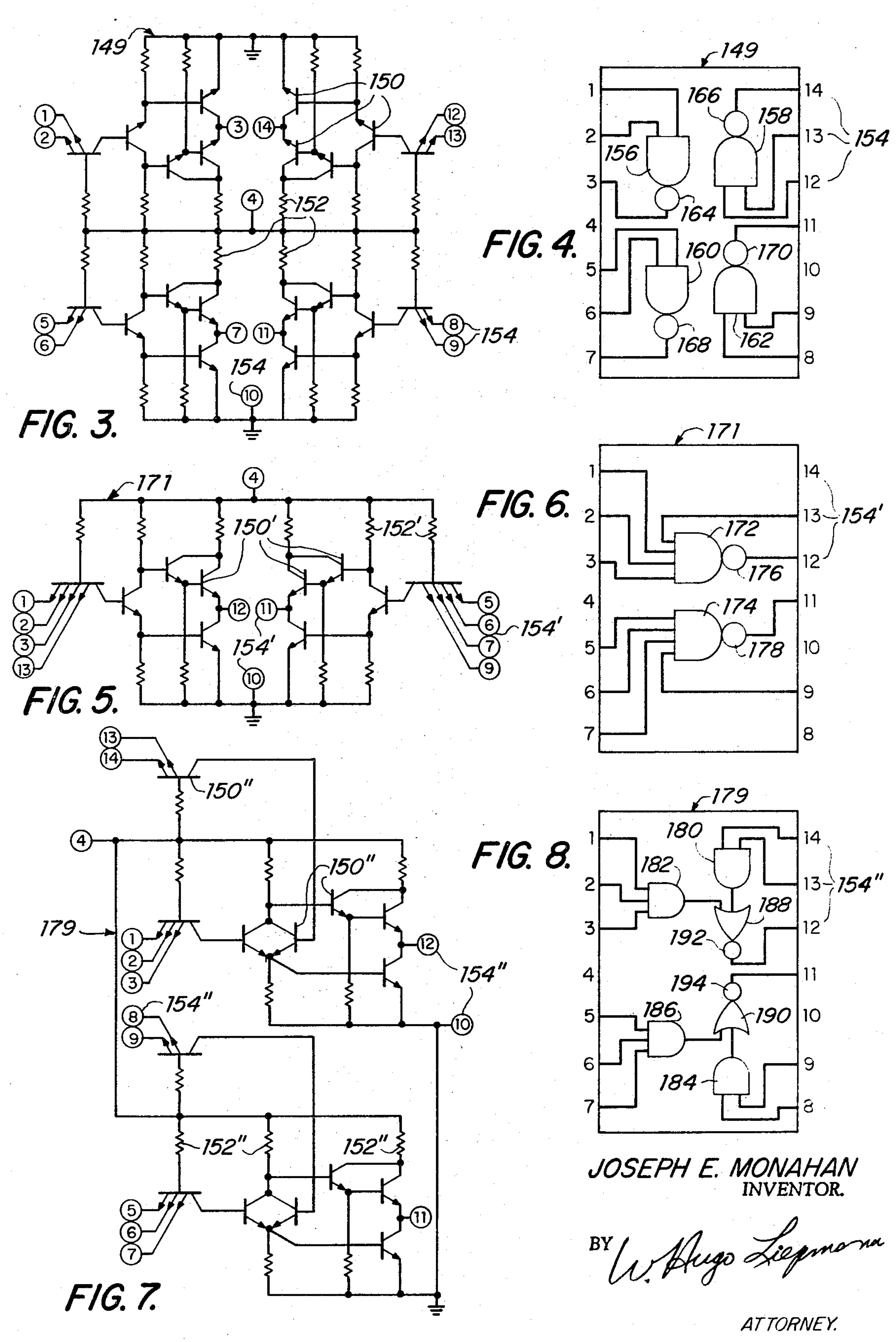
FIG. 3 is a schematic representation of a commercially available integrated circuit for use in the circuit of FIG. 1.
FIG. 4 is a logic block diagram of the circuit of FIG. 3.
FIG. 5 is a schematic representation of a second commercially available integrated circuit for use in the circuit of FIG. 1.
FIG. 6 is a logic block diagram of the circuit of FIG. 5.
FIG. 7 is a schematic representation of a third commercially available integrated circuit for use in the circuit of FIG. 1.
FIG. 8 is a logic block diagram of the circuit of FIG. 7.

As a particular example of a construction having no discrete capacitors or inductors, the circuit of FIG. 1 can be constructed using three commercially available integrated circuit modules. The first integrated circuit module 149, FIG. 3, is designated as a NAND/NOR GATE TNG 3442 available from the Transitron Electronic Corporation. The circuit consists of only transistors 150 and resistors 152 and has 14 pins 154. As shown in FIG. 4 the integrated circuit module 149 provides four AND-circuits 156, 158, 160, 162, each having an inverter 164, 166, 168 and 170 at its output. Pins 154 numbered 4 and 10 are not used.

A second integrated circuit module 171, FIG. 5, is designated as a NAND/NOR GATE TNG 3142 and is also available from the Transitron Electronic Corporation. This circuit too consists of only transistors 150′ and resistors 152′ and has 14 pins 154′. As shown in FIG. 6 the integrated circuit module 171 provides two AND-circuits 172, 174 each having an inverter 176, 178 at its output. Output pins 154′ numbered 4, 8, 10 and 14 are not used.

A third integrated circuit module 179, FIG. 7, is designated as an exclusive OR GATE TNG 4242 and is also available from the Transitron Electronic Corporation. This circuit consists of only transistors 150″ and has 14 pins 154″. As shown in FIG. 8, the integrated circuit module 179 provides four AND-circuits 180, 182, 184, and 186 and two OR-circuits 188, 190 each of which has an inverter at its output 192, 194. Pins 154''numbered 4 and 10 are not used.

As is apparent from FIGS. 3, 5, and 7 none of the circuit modules 149, 171 or 179 contains capacitive or inductive elements: only semiconductor and resistor elements are used. Other circuits may be used to construct the circuit of FIG. 1 and semiconductors such as diodes may be used in place of certain biasing resistors.

Figure 9:
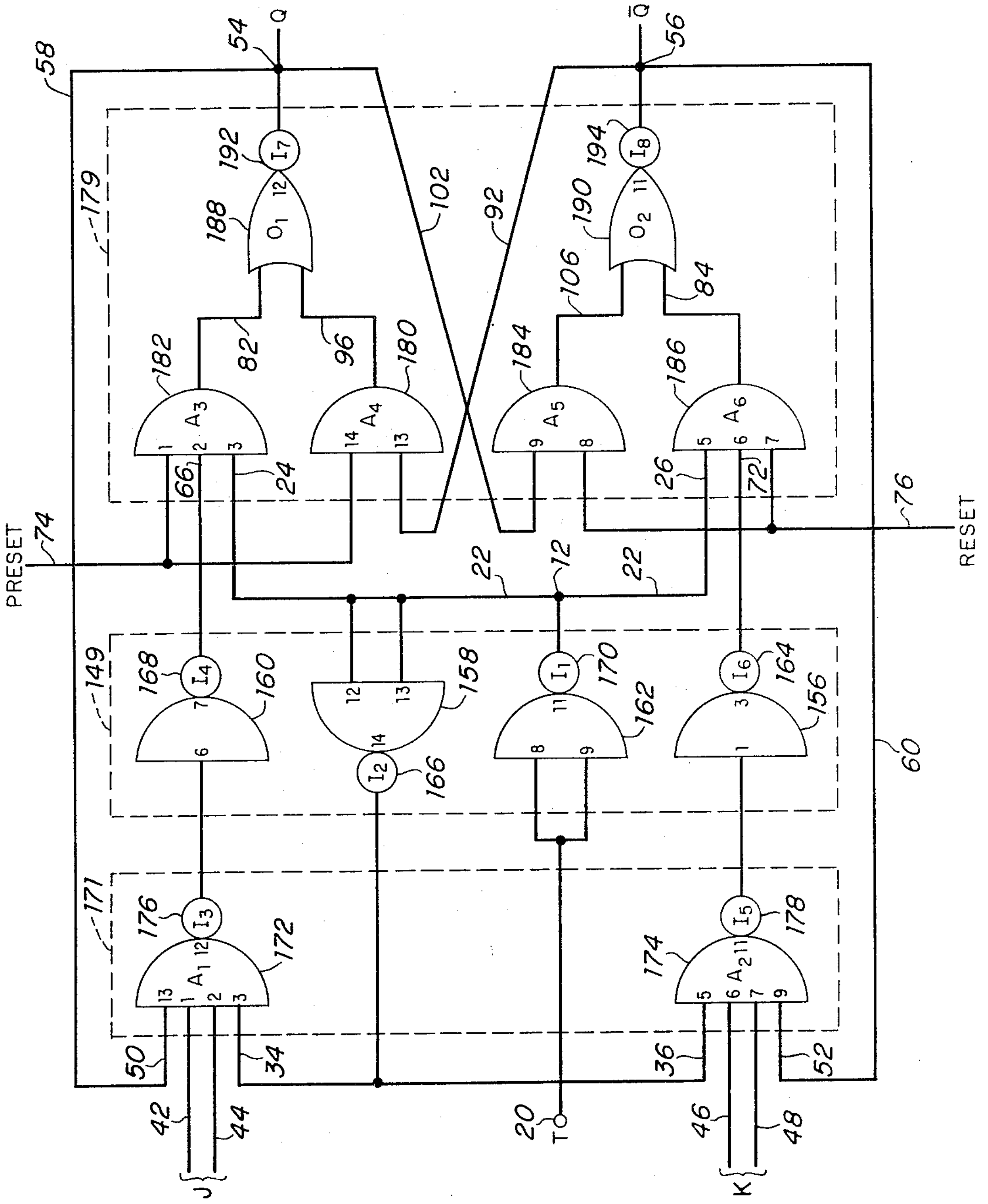
FIG. 9 is a logic block diagram showing the circuits of FIGS. 4, 6, and 8 connected to form the circuit of FIG. 1.

The integrated circuit modules 149, 171, and 179 are shown connected together in FIG. 9 to form the circuit of FIG. 1. In FIG. 9 the pins of each circuit module are shown within the logic symbol to which they pertain and lines and terminals identical with lines and terminals of FIG. 1 have been given the same reference numbers to indicate clearly the correspondence of FIGS. 1 and 9. In integrated circuit module 171: AND-circuit 172 performs the function of $A_1$ AND-circuit 38: inverter 176 performs the function of $I_3$ inverter 62; AND-circuit 174 performs the function of $A_2$ AND-circuit 40; inverter 178 performs the function of $I_5$ inverter 68.

In integrated circuit module 149, circuit 160 is connected to perform no delay or logic function and inverter 168 performs the function of $I_4$ inverter 64. Circuit 158 is connected to perform no delay or logic function and inverter 166 performs the function of $I_2$ inverter 32. Circuit 162 is connected to perform no delay or logic function and inverter 170 performs the function of $I_1$ inverter 10. Circuit 156 is connected to perform no delay or logic function and inverter 164 performs the function of $I_6$ inverter 70.

In integrated circuit module 179 AND-circuit 182 performs the function of $A_3$ AND-circuit 28; AND-circuit 180 performs the function of $A_4$ AND-circuit 86; AND-circuit 184 performs the function of $A_5$ AND-circuit 88; AND-circuit 186 performs the function of $A_6$ AND-circuit 30; OR-circuits 188, 190 perform the function of $O_1$ OR-circuit 78 and $O_2$ OR-circuit 80, respectively; and inverter circuits 192, 194 perform the functions of $I_7$ inverter 98 and $I_8$ inverter 96.

Other embodiments will occur to those skilled in the art and are within the scope of the following claims:

Having described the invention, what is claimed as new and secured by Letters Patent is:

1. A complementing bistable circuit comprising:

A. a flip-flop circuit having first and second inputs and first and second outputs;

B. a first pulse generator system including:

1. input means for receiving signals in either of first and second states;
2. first logic circuit means having a first input and a second input and providing a selected output signal only when all of its inputs are at the first state;
3. first means for connecting said input means to said first input of said first logic circuit means;
4. first inverter delay means connected between said input means and said second input of said first logic circuit means, and comprising transistor inverters devoid of timing capacitors and of timing inductors;
5. said first logic circuit means providing an output pulse beginning when each signal at its inputs is in the first state and ending when said first inverter delay means produces an inverted delayed signal of the second state at said second input of said first logic circuit means;

C. a second pulse generator system connected with said input means for receiving said signals in either of first and second states and including:

1. second logic circuit means having a first input and a second input and providing an output signal when all of its inputs are at the first state;
2. second means for connecting said input means to said first input of said second logic circuit means;
3. second inverter delay means connected between said input means and said second input of said second logic circuit means, and comprising transistor inverters devoid of timing capacitors and of timing inductors;

4. said second logic circuit means providing an output pulse beginning when each signal at its inputs are in the first state and ending when said second inverter delay means produces an inverted delayed signal of the second state at said second input of said second logic circuit means;

D. said first logic circuit means having its output connected to said first input of said flip-flop circuit and said second logic circuit means having its output connected to said second input of said flip-flop circuit.

2. The complementing bistable circuit of claim 1 further comprising pulse steering means including:

A. third logic circuit means associated with said first pulse generator system and responsive to the signal at said first output of said flip-flop circuit; and B. fourth logic circuit means associated with said second pulse generator system and responsive to the signal at said second output of said flip-flop circuit.

3. The complementing bistable circuit of claim 2 in which said first inverter delay means includes at least:

A. a first logic inverter circuit having its input connected to the output of said third logic circuit means;

B. a second logic inverter circuit having its input connected to the output of said third logic circuit means; and C. a third logic inverter circuit having its input connected to the output of said second logic inverter circuit and its output connected to said second input of said first logic circuit means.

4. The complementing bistable circuit of claim 3 in which said second inverter delay means includes at least:

A. said first logic inverter circuit with its output connected to said fourth logic circuit means;

B. a fourth logic inverter circuit having its input connected to the output of said fourth logic circuit means; and C. a fifth inverter circuit having its input connected to the output of said fourth logic inverter circuit and its output connected to said second input of said second logic circuit means.

5. The complementing bistable circuit of claim 1 further including an inverter connected at the input of said bistable circuit for inverting the positive transition leading edge of incoming signals to a negative transition leading edge for operating said bistable circuit.

6. The circuit of claim 1 in which:

A. said flip-flop circuit and said pulse generators have like integrated-circuit constructions, and B. each pulse generator comprises a number of said transistor inverters sufficient to provide each said output pulse from a logic circuit means with a duration longer than the operating time of said flip-flop circuit to change the signals at both outputs thereof after receipt of a signal change at an input thereof.

7. In a circuit coupled to generate output signals having first and second states alternatively at first and second output terminals in response to successive input signals received at a first input terminal, the combination comprising:

A. bistable means having first and second inputs and first and second outputs, said first output coupled to said first output terminal and said second output coupled to aid second output terminal;

B. first pulse generator means including 1. first delay means coupled to said first input terminal for producing first delayed input signals, and
2. first gate means coupled to produce first control signals when said input signals and said first delayed input signals are in a preselected state;

C. second pulse generator means including 1. second delay means coupled to said first input terminal for producing second delayed input signals, and
2. second gate means coupled to produce second control signals when said input signals and said second delayed input signals are in a preselected state; and D. means coupling said first and second control signals to said first and second inputs respectively of said bistable means, whereby a first of said input signals generates said first control signal causing said bistable means to change the state of said output signals at said first and second output terminals and whereby a second of said input signals generates said second control signal causing said bistable means to again change the state of said output signals at said first and second output terminals.

8. The combination as defined in claim 7 wherein each of said first and second delay means includes an inverter circuit.

9. The combination as defined in claim 8 further comprising:

A. first signal-steering means coupled with said first pulse generator means and responsive to a first-steering signal having first and second states for inhibiting the generation of said first control signal when said first steering signal has a second state; and B. second signal-steering means coupled with said second pulse generator means and responsive to a second steering signal having first and second states for inhibiting the generation of said second control signal when said second steering signal has a second state.

10. The combination as defined in claim 9 wherein said first steering signal is produced by said output signal at said first output terminal and wherein said second steering signal is produced by said output signal at said second output terminal.

11. The combination as defined in claim 8 wherein each of said first and second delay means includes a plurality of said inverter circuits sufficient to provide each of said first and second control signals with a duration long enough to be sufficient to switch the output signal state of said bistable means and short enough to be gone before the next input signal is received.

* * * * *